(12) United States Patent
Hu et al.

(10) Patent No.: US 7,641,997 B2
(45) Date of Patent: Jan. 5, 2010

(54) DESIGN AND SYNTHESIS OF GUEST-HOST NANOSTRUCTURES TO ENHANCE IONIC CONDUCTIVITY ACROSS NANOCOMPOSITE MEMBRANES

(75) Inventors: Michael Z. Hu, Knoxville, TN (US); Igor Kosacki, Oak Ridge, TN (US)

(73) Assignee: UT-Battelle LLC, Oak Ridge, TN (US)

( * ) Notice: Subject to any disclaimer, the term of this patent is extended or adjusted under 35 U.S.C. 154(b) by 844 days.

(21) Appl. No.: 10/947,836

(22) Filed: Sep. 23, 2004

(65) Prior Publication Data

US 2006/0063052 A1    Mar. 23, 2006

(51) Int. Cl.
*H01M 8/10* (2006.01)
*H01M 8/00* (2006.01)
*G01N 27/26* (2006.01)

(52) U.S. Cl. ............................ 429/30; 429/33; 429/46; 429/12; 204/424; 204/421

(58) Field of Classification Search ...................... None
See application file for complete search history.

(56) References Cited

U.S. PATENT DOCUMENTS

| | | | |
|---|---|---|---|
| 4,933,054 A | 6/1990 | Mazanec et al. | |
| 5,130,210 A * | 7/1992 | Iwasaki et al. | 429/33 |
| 5,160,618 A * | 11/1992 | Burggraaf et al. | 210/490 |
| 5,632,874 A | 5/1997 | Christiansen | |
| 5,827,620 A | 10/1998 | Kendall | |

(Continued)

OTHER PUBLICATIONS

Fuel Cell Handbook, 2000, U.S. Department of Energy, fifth edition, pp. 8-1 to 8-5.*

(Continued)

*Primary Examiner*—Dah-Wei D Yuan
*Assistant Examiner*—Katherine Turner
(74) *Attorney, Agent, or Firm*—Quarles & Brady, LLP

(57) ABSTRACT

An ion conducting membrane has a matrix including an ordered array of hollow channels and a nanocrystalline electrolyte contained within at least some or all of the channels. The channels have opposed open ends, and a channel width of 1000 nanometers or less, preferably 60 nanometers or less, and most preferably 10 nanometers or less. The channels may be aligned perpendicular to the matrix surface, and the length of the channels may be 10 nanometers to 1000 micrometers. The electrolyte has grain sizes of 100 nanometers or less, and preferably grain sizes of 1 to 50 nanometers. The electrolyte may include grains with a part of the grain boundaries aligned with inner walls of the channels to form a straight oriented grain-wall interface or the electrolyte may be a single crystal. In one form, the electrolyte conducts oxygen ions, the matrix is silica, and the electrolyte is yttrium doped zirconia.

21 Claims, 5 Drawing Sheets

U.S. PATENT DOCUMENTS

| | | |
|---|---|---|
| 6,004,688 A | 12/1999 | Goodenough et al. |
| 6,027,666 A | 2/2000 | Ozin et al. |
| 6,153,163 A | 11/2000 | Prasad et al. |
| 6,180,222 B1 | 1/2001 | Schulz et al. |
| 6,207,311 B1 | 3/2001 | Baozhen et al. |
| 6,517,693 B2 | 2/2003 | Taniguchi |
| 6,558,831 B1 | 5/2003 | Doshi et al. |
| 6,562,747 B2 | 5/2003 | Symons et al. |
| 6,586,127 B1 | 7/2003 | Ishihara et al. |
| 6,638,885 B1 | 10/2003 | McGrath et al. |
| 6,653,009 B2 | 11/2003 | Wang et al. |
| 6,677,070 B2 | 1/2004 | Kearl |
| 6,696,258 B1 | 2/2004 | Wei et al. |
| 6,716,378 B2 | 4/2004 | Yank et al. |
| 6,746,791 B2 | 6/2004 | Yadav et al. |
| 2002/0118027 A1* | 8/2002 | Routkevitch et al. ........ 324/694 |

OTHER PUBLICATIONS

Webster's Third New International Dictionary, 1993, [online], [retrieved on Nov. 10, 2008], Retrieved from Lion Reference using Internet <URL: http://lionreference.chadwyck.com/searchFulltext.do?id=...26355491_10106&area=mwd&forward=refshelf&trail=refshelf>.*

Dong et al., "Grain growth in nanocrystalline yttrium-stabilized zirconia thin films synthesized by spin coating of polymeric precursors," J. Nanosci. Nanotech., 2, p. 161-169 2002.

* cited by examiner

US 7,641,997 B2

DESIGN AND SYNTHESIS OF GUEST-HOST NANOSTRUCTURES TO ENHANCE IONIC CONDUCTIVITY ACROSS NANOCOMPOSITE MEMBRANES

STATEMENT REGARDING FEDERALLY SPONSORED RESEARCH

This invention was made with Government support under Contract No. DE-AC05-00OR22725 awarded to UT-Battelle, LLC, by the U.S. Department of Energy. The Government has certain rights in this invention.

CROSS-REFERENCES TO RELATED APPLICATIONS

Not Applicable.

BACKGROUND OF THE INVENTION

1. Field of the Invention

This invention relates an ion conducting membrane having a matrix including an ordered array of hollow channels and a nanocrystalline electrolyte contained within at least some of the channels. The channels have opposed open ends, and a channel width of 1000 nanometers or less, and most preferably, the channels have a width of 10 nanometers or less. The electrolyte has grain sizes of 100 nanometers or less, and preferably the electrolyte has grain sizes of 1 to 50 nanometers. In one form, the electrolyte conducts oxygen ions, the matrix is silica, and the electrolyte is yttrium doped zirconia.

2. Description of the Related Art

Oxide-based ionic conductors, such as oxygen-conducting or proton-conducting ceramic membranes, are extremely important materials for a wide-range applications such as in fuel cells (electrolytes or electrodes), sensors, gas separation and catalysis, microbatteries, thermoelectric and magnato hydrodynamic generators, and other solid-state ionics-based devices. (See, for example, U.S. Pat. Nos. 4,933,054, 5,827,620, 6,004,688, 6,153,163, 6,207,311, 6,558,831, 6,562,747, 6,653,009, and 6,677,070 which are incorporated herein by reference along with all other publications cited herein.) Several recent review articles have well documented the current development of various ionic or mixed conducting oxides, including stabilized zirconia, ceria, and lanthanide oxides (see, for example, Goodenough, "Oxide-ion electrolytes," *Annu. Rev. Mater. Res.*, 33, 91, 2003; Adachi et al., "Ionic conducting lanthanide oxides," *Chem. Rev.*, 102, 2405, 2002; and Kreuer, "Proton-conducting oxides," *Annu. Rev. Mater. Res.*, 33, 333, 2003). A major technological challenge is regarding how to create and utilize these potential "candidate" conducting oxides in the form of thin-layer membranes (see, De Jonghe et al., "Supported electrolyte thin film synthesis of solid oxide fuel cells," *Annu. Rev. Mater. Res.*, 33, 169, 2003; and Will et al., "Fabrication of thin electrolytes for second-generation solid oxide fuel cells," *Solid State Ionics*, 131, 79, 2000) that promise much higher ionic conductivity across the membrane than any existing ceramic membrane can offer.

It is believed that fuel cells—as cleaner and more efficient energy conversion systems, will reshape the future of automotive propulsion, distributed power generation, and low power portable devices (battery replacement) (see Carrette et al., "Fuel cells: principles, types, fuels, and applications," CHEMPHYSCHEM, 1, 162, 2000). Solid oxide fuel cells present an efficient and ecologically acceptable way to simultaneously generate heat/electricity with theoretical density as high as 70% and with low emissions (see Oljaca et al., "Nanomaterials for solid oxide fuel cells," *American Ceramic Society Bulletin*, 82 (1), 38, 2003). In a typical solid oxide fuel cell, the oxygen reduction reaction taking place at the cathode is: $O_2+4e^- \rightarrow 2O^{2-}$. The $O^{2-}$ ion is transferred from the cathode through the electrolyte to the anode. One oxidation reaction taking place at the anode is: $2H_2+2O^{2-} \rightarrow 2H_2O+4e^-$. The oxidation reaction at the anode, which liberates electrons, in combination with the reduction reaction at the cathode, which consumes electrons, results in a useful electrical voltage and current through the electrical load.

Widespread commercialization of solid oxide fuel cells is limited by their high operating temperature (>800° C.) and thus high system cost. One future development goal for intermediate-temperature solid oxide fuel cells is to introduce more promising alternative materials (such as electrolyte and electrode materials) that would enable lowering the operating temperature from 1000° C. to below 800° C. without loss of performance (see McEvoy, "Thin SOFC electrolytes and their interfaces—a near-term research strategy," *Solid State Ionics*, 132, 159, 2000; Huijsmans, "Ceramics in solid oxide fuel cells," *Current Opinion in Solid State and Materials Science*, 5, 317 2001; De Jonghe et al. supra; and Brandon et al., "Recent advances in materials for fuel cells," *Annu. Rev. Mater. Res.*, 33, 183, 2003). Lower temperature operation or processing will reduce the system materials requirement and cost, and also avoid many undesirable interfacial reactions (e.g., formation of insulating interphase of lanthanum zirconate) between electrode and electrolyte materials (see McEvoy supra). At low operation temperatures, superior high ionic conductivity of the oxide electrolyte layer (>$10^{-2}$ S/cm) is required for the success of future fuel cell technology. Thus, there is a need for a stable electrolyte membrane which offers higher ionic conductivity at lower temperatures.

Ionic conductivity in solid electrolytes can be improved by dissolving appropriate impurities/dopants into the structure or by introducing interfaces (such as grain boundaries) that cause the redistribution of ions in the space-charge regions (see, Sata et al., "Mesoscopic fast ion conduction in nanometer-scale planar heterostructures," Nature, 408, 946, 2000). However, doping has its limitations in enhancing conductivity.

Nanomaterials with the control of microstructure down to the nanoscale have been considered promising in improving the materials performance for solid-state ionics and solid oxide fuel cells (see Tuller, "Defect engineering: design tools for solid state electrochemical devices," *Electrochimica Acta*, 48 (20-22), 2879, 2003; and Oljaca et al, supra). It has been reported that conductivity in the nanocrystalline grain-boundary regions is greater than for larger grains, due to fast ion diffusion through grain boundaries (see Tuller, "Ionic conduction in nanocrystalline materials," *Solid State Ionics*, 131,143, 2000). For example, nanocrystalline solid oxide electrolytes (such as yttrium stabilized zirconia and cation-doped $CeO_2$) have typically shown orders-of-magnitude higher conductivity than those in microcrystalline oxide ceramics (see Kosacki et al., "Nonstoichiometry and electrical transport in Sc-doped zirconia," *Solid State Ionics*, 152-153, 431, 2002; Kosacki and Anderson, "Grain boundary effects in nanocrystalline mixed conducting films," Encyclopedia of Materials: Science and Technology, Elsevier Science Ltd., pp. 3609-3617, 2001; Suzuki et al., "Microstructure-electrical conductivity relationships in nanocrystalline ceria thin films," *Solid State Ionics*, 151, 111, 2002; Suzuki et al., "Defect and mixed conductivity in nanocrystalline doped cerium oxide," *J. Am. Ceram. Soc.*, 85, 1492, 2002; and Suzuki et al., "Electrical conductivity and lattice defects in nanocrystalline cerium oxide thin films," *J. Am. Ceram. Soc.,* 84, 2007, 2001). A few methods, including nanopowder consolidation, sol-gel, and polymer precursor coating, have been investigated for making nanocrystalline phase electrolyte films/membranes (see, Dong and Hu et al., "Grain growth in nanocrystalline yttrium-stabilized zirconia thin films synthesized by spin coating of polymeric precursors," *J. Nanosci. Nanotechnol.,* 2, p. 161-169, 2002; Menzler et al., "Materials synthesis and characterization of 8YSZ nanomaterials for the fabrication of electrolyte membranes in solid oxide fuel cells," *Ceramics International,* 29, 619, 2003; and Zhu, "Fast ionic conducting film ceramic membranes with advanced applications," *Solid State Ionics,* 119, 305, 1999). However, none of these membranes are suitable for providing enhanced cross-membrane conductivity. Furthermore, the intrinsic problem of nanograin growth (i.e. thermal stability of nanostructure) in nanocrystalline films/membranes at high temperatures reduces the conductivity. Therefore, there is also a need for strategies to maintain the small nanocrystal grain size and to fully utilize grain boundary interfaces in order to enhance and maintain ionic conductivity.

SUMMARY OF THE INVENTION

It has been discovered that the ionic conductivity of solid electrolytes can be enhanced by the introduction of high density interfaces, which act as rapid diffusion paths for oxygen vacancies. Since the volume of the grain boundary phase depends upon the microstructure, it is possible to obtain a material whose electrical conductivity is controlled by interfaces.

In the present invention, an ion conducting nanocomposite membrane, including aligned nanophases (the "guest") confined inside a matrix layer (the "host") having ordered arrays of nanopore channels that are oriented perpendicular to the membrane surface, is provided. In one example embodiment of the invention, the nanocrystallization of yttrium stabilized zirconia (YSZ) inside an oriented mesoporous membrane layer of silica or alumina is achieved. (As used herein, "mesoporous" generally refers to materials pores range from between about 1 nanometer up to about 100 nanometers.) The new nanocomposite heterostructure provides drastically enhanced ionic conductivity across the membrane layer as well as improved thermal stability of nanostructure (in reference to a non-oriented, non-confined nanocrystalline film prepared by a sol-gel or a polymer precursor coating method).

It is one advantage of the present invention to provide an ion conducting nanocomposite membrane with at least an order-of-magnitude higher ionic conductivity than the best currently available ceramic membranes.

It is another advantage of the present invention to provide a nanostructured membrane useful in sensor arrays, catalysis, magnetic memory arrays, quantum-dot arrays, photonic crystals, microfabricated fluidic devices, microelectro-mechanical systems, solar cells, selective liquid separation, or gas separation.

It is yet another advantage of the present invention to provide a nanostructured membrane that utilizes the available high conductivity of candidate electrolytes (such as yttrium stabilized zirconia) for a low temperature solid oxide fuel cell.

These and other features, aspects, and advantages of the present invention will become better understood upon consideration of the following detailed description, drawings, and appended claims.

DETAILED DESCRIPTION OF THE INVENTION

As mentioned above, ionic conductivity in solid electrolytes can be improved by dissolving appropriate impurities/dopants into the structure or by introducing interfaces (such as grain boundaries) that cause the redistribution of ions in the space-charge regions. However, doping has its limitations in enhancing conductivity. It has been discovered that for ionic conducting oxides, it is important to apply grain-boundary engineering and tailored control of nanostructures as strategies to enhance their ionic conductivity across/through a membrane.

Figure 1:
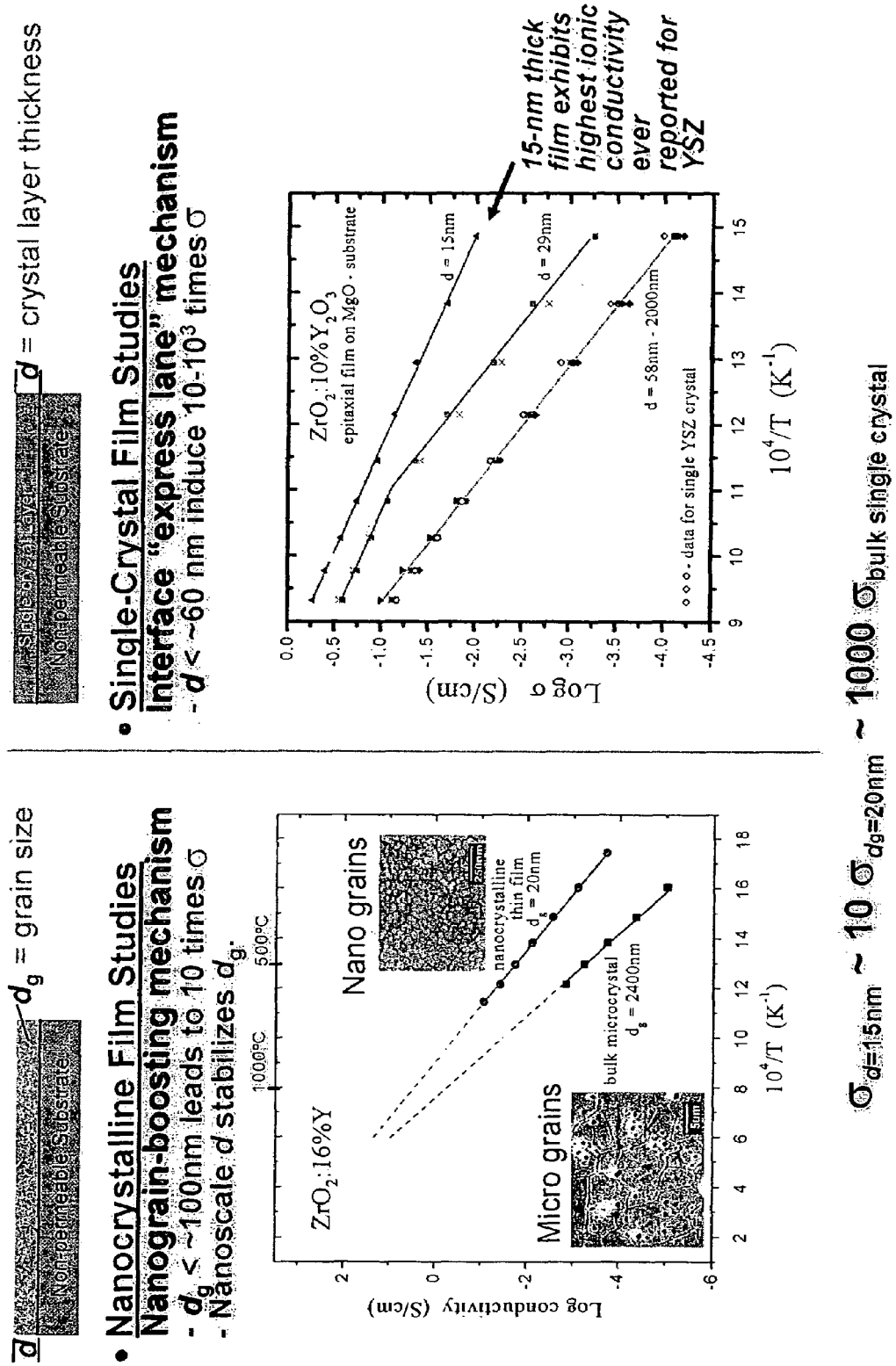
FIG. 1 shows graphs of studies of the electrical properties of single-layer yttrium-stabilized zirconia thin films deposited on a substrate.

Studies of the electrical properties of single-layer yttrium-stabilized zirconia (YSZ) thin films deposited on a magnesium oxide substrate are shown in FIG. 1 which demonstrates that it is possible to greatly enhance conductivity by nanoscale control. Nanocrystalline film studies show a nanograin conductivity boosting mechanism. When the grain size ($d_g$) <~100 nanometers, this leads to 10 times the conductivity. Also, a nanoscale film thickness (d) stabilizes the grain size ($d_g$). This may be called a "grain boundary effect" conductivity enhancement mechanism. See the left graph in FIG. 1. Single crystal film studies also demonstrated an interface "express lane" mechanism. A crystal layer thickness (d) <~60 nanometers induced a $10-10^3$ times increase in conductivity. This may be called a "thickness effect" conductivity enhancement mechanism. See the right graph in FIG. 1.

Figure 2:
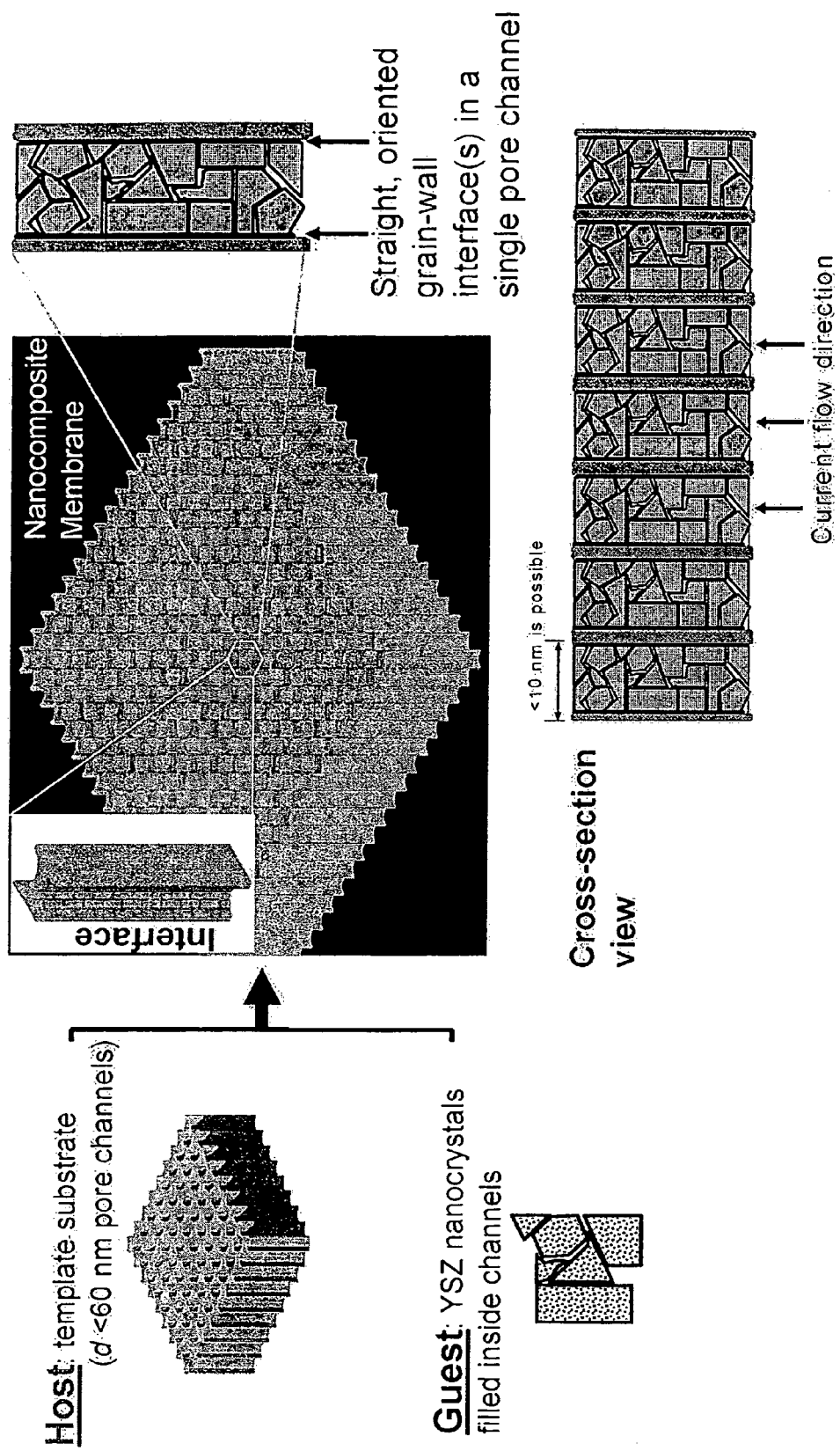
FIG. 2 is a schematic of an ion conducting nanocomposite membrane according to the invention.

It has been discovered by the present inventors that an ion conducting nanocomposite membrane can be prepared that maximizes both the "grain boundary effect" ion conductivity enhancement mechanism and the "thickness effect" ion conductivity enhancement mechanism. In the present invention, a novel approach is provided that integrates ionic conductivity-enhancement mechanisms into one nanocomposite membrane layer design. See FIGS. 2 and 3. In the example embodiment of the invention shown in FIG. 2, a host template substrate is provided that preferably has pore channels less than 60 nanometers. Guest yttrium stabilized zirconia (YSZ) nanocrystals are filled inside the pore channels.

Figure 3:
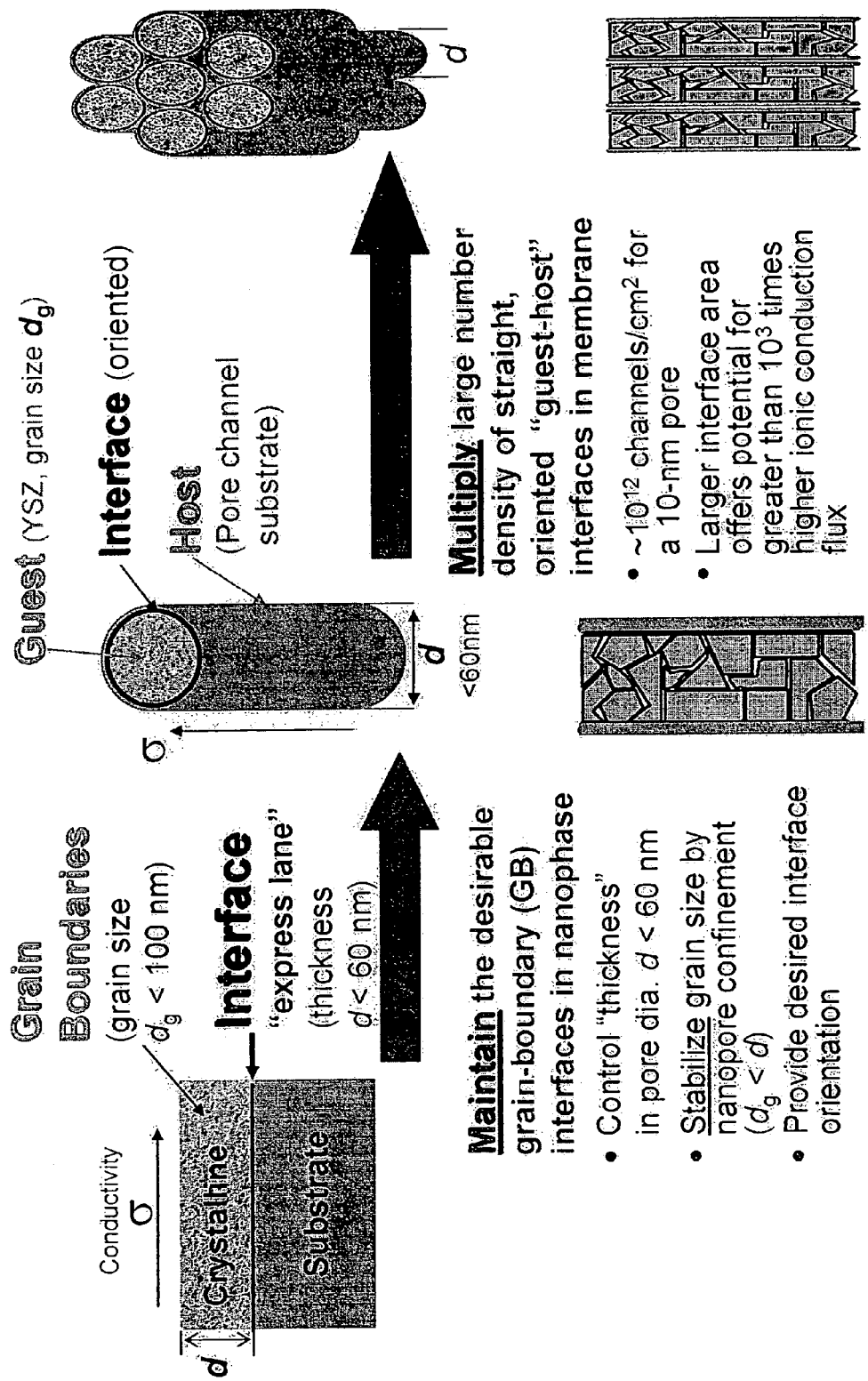
FIG. 3 is a schematic illustration of ion conducting enhancement mechanisms in a nanocomposite membrane according to the invention.

Without intending to be bound by theory, it is believed that ionic conductivity enhancement is achieved by way of the example features shown in FIG. 3. In particular, the desirable grain-boundary interfaces are maintained in the nanophase by: (i) controlling the "thickness effect" in the template substrate by using a template pore diameter (d) <60 nanometers;

(ii) stabilizing grain size ($d_g$) by nanopore confinement ($d_g<d$); and (iii) providing a desired guest-host interface orientation. Also, the template provides a large number density of straight, oriented "guest-host" interfaces in the membrane (e.g., ~$10^{12}$ channels/cm$^2$ for a 10-nm pore). Note the oriented straight grain-substrate interfaces in FIG. 3. The larger interface area allows for greater than $10^3$ times higher ionic conduction flux.

Therefore, in one aspect, the invention provides an ion conducting nanocomposite membrane including a matrix including an ordered array of hollow channels and a crystalline electrolyte contained within at least some of the channels. By "electrolyte", we mean a substance that provides ionic conductivity. The channels have opposed open ends, an axial length from one open end to the other open end, and a channel width of 1000 nanometers or less. Preferably, the channels have a width of 60 nanometers or less, and most preferably the channels have a width of 10 nanometers or less. In one configuration, the channels have a hexagonal cross-section and are aligned perpendicular to a surface of the matrix. The length of the channels may be 10 nanometers to 1000 micrometers. In one form, the matrix includes an oxide such as silica or alumina.

With respect to the crystalline electrolyte contained within at least some of the channels (or all the channels), the electrolyte has grain sizes of 100 nanometers or less, and preferably the electrolyte has grain sizes in the range of 1 to 50 nanometers. The electrolyte may include grains with boundaries aligned with inner walls of the channels to form a straight oriented grain-wall interface. The electrolyte grain sizes may be less than the channel width. In one form, the crystalline electrolyte contained within at least some of the channels is a single crystal. In an example embodiment, the electrolyte conducts oxygen ions and includes an oxide and a metal dopant such as metal doped zirconia. In another example embodiment, the electrolyte conducts protons and includes metal doped ceria. In yet another example embodiment, the matrix is silica, and the electrolyte is yttrium or yttria doped zirconia.

The ion conducting nanocomposite membrane according to the invention is advantageous for practical membrane technology development for many reasons including: (1) there is a great number density of grain boundaries or interfaces via creation of nanocrystalline phases containing grain sizes in the range of 2-50 nanometers; (2) there is the realization of ionic conductivity enhancement by creating orientated nanograin surfaces/interfaces aligned along the current flow direction (i.e., across the membrane layer); and (3) there is improvement of nanostructure thermal stability due to nanoscale confinement of grain growth inside nanoporous channels. The nanostructured membrane, illustrated in FIGS. 2 and 3, includes nanocrystalline phases of oxide electrolyte (guest, e.g., YSZ nanograins) encapsulated inside a host, which is a solid (e.g., SiO$_2$ or alumina) matrix layer having ordered arrays of large-density, oriented, uniform, nanopore cylinder channels.

The present invention enhances and maintains the ionic conductivity in nanocrystalline materials. The present invention utilizes oriented/aligned grain boundaries/interfaces (particularly near the channel walls) and confines nanograin size (for improved thermal stability) by design. In the nanocomposite membrane according to the invention, the nanopore channels across the membrane create preferred orientation and alignment of nanocrystal grain boundaries and interfaces (i.e., near the channel walls) along the channel direction. Such interface orientation (grain alignment) and its large density can enhance conductivity across the membrane.

The creation of oriented grain interfaces (or boundaries) and the number density increase of such interfaces is preferred to enhance conductivity along a direction perpendicular to the membrane. Alternatively, the nanocrystalline material may be a single crystal.

The membrane of the present invention maintains enhanced conductivity through confined nanograin size. The thermal stability of nanostructures, related to grain growth phenomena under relatively high temperature processing or operation conditions, is known to be a significant disadvantage for practical application of nanocrystalline membranes/films that are typically prepared by nanopowder, sol-gel, or polymer precursor coating methods. A nanocomposite membrane according to the invention that includes the nanopore host of FIGS. 2-4 takes advantage of the nanopore confinement effect that limits the growth of grain size within the nanopore channels. Therefore, the present invention resolves the thermal stability problem and maintains the desirable nanograin size in the membrane.

Host materials, which are used in a host-guest nanocomposite membrane according to the invention, can be synthesized using different methods. The host material is preferably a solid oxide or silicon membrane layer matrix that contains ordered arrays of uniform sized, oriented nanopore cylinder channels. Nanoporous materials may be prepared by a method such as that described in U.S. Pat. No. 6,716,378.

Ordered nanopore host materials having improvements over the materials described in U.S. Pat. No. 6,716,378 may be prepared using an engineered molecular assembly templated synthesis developed by V. F. de Almeida, D. A. Blom, L. F. Allard, M. Z. Hu, S. Dai, C. Tsouris, and Z. Zhang, which allows for the formation of large-area domains of hexagonally ordered cylinder channels (<10 nanometers), standing up in perpendicular to the layer surface. The host material preferably has a pore diameter ranging from sub-nanometer to mesoscopic 50 nanometers. The aspect ratio of length over diameter typically is from 10 to 1000.

Figure 4:
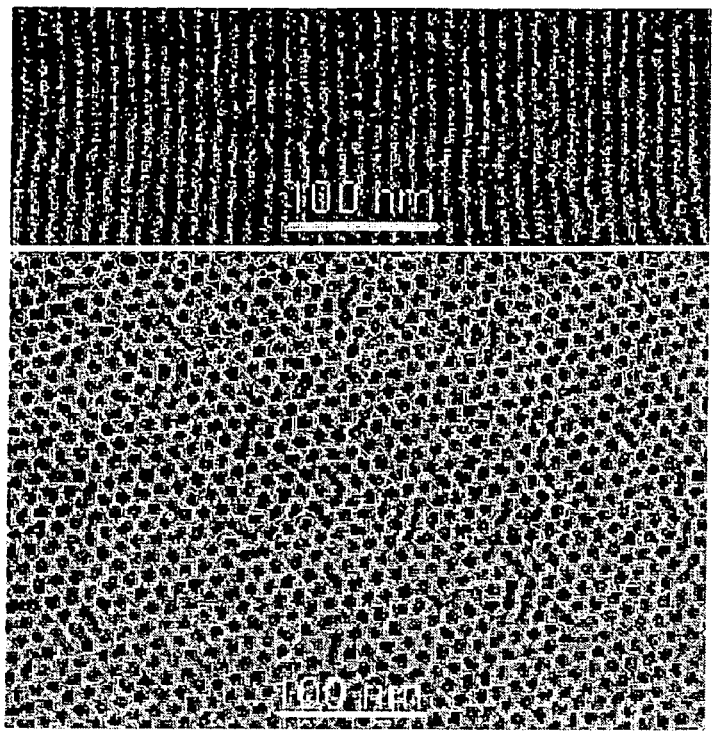
FIG. 4 shows scanning transmission electron microscope images of a silica layer host suitable for use in an ion conducting nanocomposite membrane according to the invention.

An example method for preparing a host material using the engineered molecular assembly templated synthesis is as follows. A sol-gel precursor solution is prepared using: 0.6875 grams of a triblock copolymer commercially available as BASF Pluronic P-123; 2.6 grams of tetraethoxysilane; 3 grams of ethanol; and 1.35 grams HCl. The mixture is aged for 3 hours at room temperature. The mixture is then applied to a TEM grid "holey carbon" film, such as the "Quantifoil" series manufactured by Structure Probe, Inc. of West Chester, Pa., USA, and a vacuum is applied under the film. Gelation of the precursor solution and consolidation of the inorganic oxide network occurs. The patterned material is calcined (e.g., at 400° C. in air) to remove the copolymer and thereby produce patterned ordered porous silica. FIG. 4 shows an example of a silica-layer host material synthesized using this method. (Dark lines and dots in the images of FIG. 4 correspond to channels of 7.5 nanometers oriented normal to the substrate.) Among other things, the engineered molecular assembly templated synthesis developed by the present inventors can create pore diameter in the range of 2 to 10 nanometers. The capability of making pore diameters <10 nanometers further pushes the conductivity toward an upper limit and increases the number density of desirable "express lane" interfaces.

Alternatively, an alumina membrane layer host matrix with relatively larger nanopore channels (10-100 nanometers) can be made by controlled acid anodization of aluminum (see, for example, Metzger et al., "Magnetic nanowires in hexagonally ordered pores of alumina," IEEE Transactions on Magnetics, 36, 30, 2000; Shawaqfeh and Baltus, "Fabrication and characterization of single layer and multilayer anodic alumina membranes," *Journal of Membrane Science*, 157, 147, 1999; Shawaqfeh and Baltus, "Growth kinetics and morphology of porous anodic alumina films formed using phosphoric acid," *J. Electrochem. Soc.*, 145, 2699, 1998; Jessensky et al., "Self-organized formation of hexagonal pore arrays in anodic alumina," *Applied Physics Letters*, 72, 1173, 1998; and Li et al., "On the growth of highly ordered pores in anodized aluminum oxide," *Chem. Mater.*, 10, 2470, 1998). The pore diameter, aspect ratio of channel length over diameter, and the layer thickness can be flexibly adjusted as described in these references. In addition, zeolite membranes with oriented columnar structures (perpendicular to the membrane surface) can also be used as a host matrix.

Guest materials, which are used in a host-guest nanocomposite membrane according to the invention, may be nanocrystalline phases inside the nanopore channels of the host material. Yttrium stabilized zirconia (YSZ) is an example nanocrystalline phase. A polymer precursor infiltration method can be used to encapsulate YSZ precursors inside the host nanopore channels, followed by the thermally induced crystallization and grain growth by treatment in a furnace. An example preparation procedure for YSZ polymer precursors and nanocrystallization is as follows. Zirconyl chloride hydrate ($ZrOCl_2$-$8H_2O$) and yttrium nitrate hydrate ($Y(NO_3)_3$-$6H_2O$) are dissolved in deionized water to give a ZrNY mole ratio of ~0.84/0.16. The solution is then mixed with ethylene glycol and glycerine with strong agitation until a clear, precipitate-free solution is obtained. The final solution is placed in an oven and the temperature controlled at 80° C. for 90 hours to polymerize the organic solvents and remove water, to achieve a suitable viscosity. The polymerized solution is then cooled and kept at room temperature for 3-5 hours. The resultant polymeric precursor molecules are polyethylene glycol chelated with metal ions.

The polymeric precursor is placed on the host material and delivered into the host nanopore channels in the solid oxide membrane layer matrix by capillary action, preferably under vacuum. The matrix is dried at, for example, 80° C. This low-temperature drying step removes the remaining volatile components such as water and ethylene glycol monomer, which could form bubbles when heated and evaporated rapidly at higher temperatures. The matrix is further heated such as at 300° C. to obtain a strong and completely dry precursor in the nanopore channels. The matrix with the polymeric precursors is placed in a furnace such that the polymeric precursors are sintered at high temperature (e.g., 200° C.-1000° C.) to convert the polymeric precursor to YSZ nanocrystalline phases. The polymer precursor infiltration and crystallization method may be repeated (as necessary) to densify the YSZ nanophase inside the channels. If desired, a gold coating (electrode layer) may be applied to the top surface and the bottom surface of the host material.

Chemical vapor deposition methods may also be used to encapsulate YSZ precursors inside the host nanopore channels. In addition, electrochemical deposition (using an electrostatic force to draw charged precursor nanoclusters into the pores) may also be used. Sol-gel methods can also be used to encapsulate YSZ precursors inside the host nanopore channels.

It should be appreciated that both the host and guest materials can be varied, and that the dimensions of the nanopore channels and nanograin size can be varied. The membrane according to the invention and the nanocomposite membrane synthesis method of the invention are not limited to just one oxide material (i.e., YSZ). Many different kinds of nanocrystalline oxides or non-oxides for various applications can be developed in the nanopore channels to take advantage of the nanocrystal confinement and orientated interfacial effects. For example, proton conducting oxides such as $BaCeO_3$ and $SrCeO_3$-based materials can be prepared as nanocrystalline phases confined in nanopore channels of a membrane according to the invention. Such nanocomposite membranes could lead to new generation of electrochemical sensor materials. Enhanced electrical conductivity and reaction kinetics in oriented nanocrystalline materials are critical to the success of gas sensing. Mesoporous membranes hosting metals like platinum and palladium could be used for solar cell and membrane catalytic reactors, hard-disk memory (magnetic recording with high signal-to-noise ratio), or for electronic/optical devices (when the guest are semiconductors such as CdS).

This invention presents a design and synthesis method for a nanocomposite membrane containing unique nanostructures. The nanocomposite membrane enables at least four major conductivity-enhancement mechanisms: (1) great number density of grain boundaries or interfaces via creation of nanocrystalline phases containing grain sizes in the range of 2-50 nanometers; (2) realization of conductivity enhancement by creating orientated nanograin surfaces/interfaces aligned along the current flow direction (i.e., across the membrane layer); (3) improvement of nanostructure thermal stability due to nanoscale confinement of grain growth inside nanoporous channels; and (4) extremely high ratio of particles on surfaces/interfaces over the total volume of particles. The invention allows grain-boundary engineering (interface density and orientation, impurity segregation), defect engineering (change of oxygen vacancy concentration), nanostructure tailoring (grain/pore size and alignment), and realization of nanophase stability (nanoscale confinement to restrict grain growth), all of which are critical to improve the properties of solid electrolytes.

Figure 5:
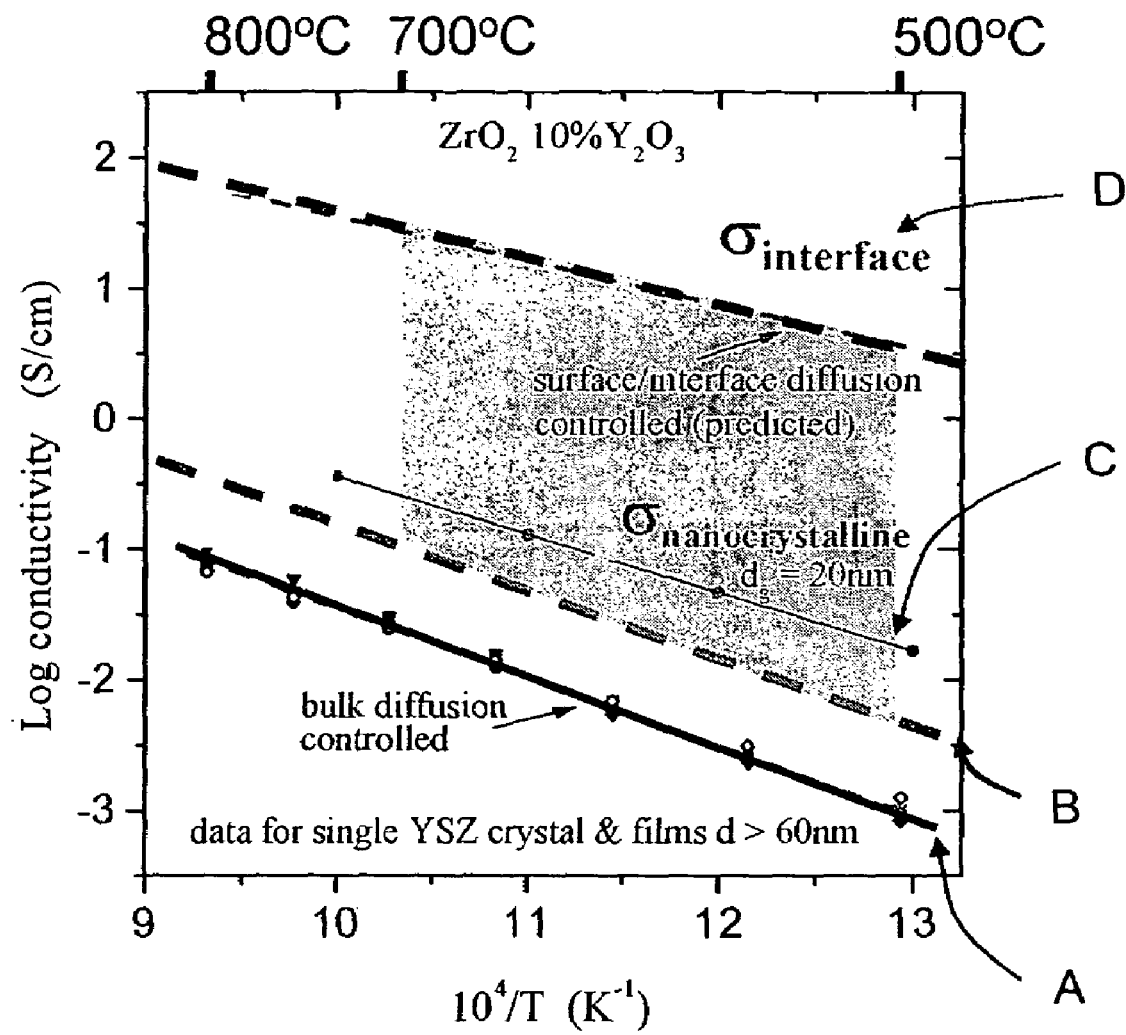
FIG. 5 shows a graph depicting increased ionic conductivity from the present invention.

The utility of a nanocomposite membrane according to the invention when used as an electrolyte membrane for a low temperature solid oxide fuel cell is demonstrated in FIG. 5. Line A in FIG. 5 shows bulk YSZ single crystal lattice-limited conductivity. Line B in FIG. 5 shows the target conductivity values for a low temperature solid oxide fuel cell electrolyte layer. Line C shows the lowest expected conductivity from thermally stable YSZ having grain sizes of about 20 nanometers (achieving nanograin-boundary mediated conductivity, 10 times higher than current YSZ membranes). Line D shows an upper limit toward the crystal-substrate interface related conductivity ($10^3$ times higher than bulk when d<10 nm).

Therefore, in another aspect, the invention provides a fuel cell including an anode layer; a cathode layer; and the membrane of the present invention between the anode layer and the cathode layer. The membrane includes (i) a matrix including an ordered array of hollow channels, the channels having opposed open ends, an axial length from one open end to the other open end, and a channel width of 1000 nanometers or less; and (ii) a crystalline electrolyte contained within at least some of the channels, the electrolyte having grain sizes of 100 nanometers or less. Preferably, the electrolyte of the membrane includes grains with boundaries aligned with inner walls of the channels to form a straight oriented grain-wall interface such that current flow is in a direction of the grain-wall interface. The invention also provides a gas sensor including the membrane or an electrocatalytic apparatus including the membrane.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. An ion conducting membrane comprising:
   a matrix including an ordered array of hollow channels, the channels having opposed open ends, an axial length from one open end to the other open end, and a channel width of 1000 nanometers or less, each of the channels in the ordered array essentially being aligned perpendicular to a surface of the matrix; and
   a crystalline electrolyte contained within at least some of the channels, the electrolyte having grain sizes of 100 nanometers or less.

2. The membrane of claim 1 wherein:
   the electrolyte has grain sizes in the range of 1 to 50 nanometers.

3. The membrane of claim 1 wherein:
   the channels have a width of 60 nanometers or less.

4. The membrane of claim 1 wherein: the channels have a width of 10 nanometers or less.

5. The membrane of claim 1 wherein: the length of the channels is 10 nanometers to 1000 micrometers.

6. The membrane of claim 1 wherein:
   the electrolyte includes grains with a part of the grain boundaries aligned with inner walls of the channels to form a straight oriented grain-wall interface.

7. The membrane of claim 1 wherein:
   the electrolyte grain sizes are less than the channel width.

8. The membrane of claim 1 wherein:
   the crystalline electrolyte contained within at least some of the channels is a single crystal.

9. The membrane of claim 1 wherein:
   the matrix comprises an oxide.

10. The membrane of claim 1 wherein: the matrix comprises silica, alumina or silicon.

11. The membrane of claim 1 wherein: the electrolyte conducts oxygen ions.

12. The membrane of claim 1 wherein:
    the electrolyte comprises an oxide, and a metal dopant or metal oxide dopant.

13. The membrane of claim 1 wherein:
    the electrolyte is metal doped zirconia or metal oxide doped zirconia.

14. The membrane of claim 1 wherein:
    the matrix comprises silica, and
    the electrolyte comprises yttria doped zirconia or yttrium doped zirconia.

15. The membrane of claim 1 wherein: the electrolyte conducts protons.

16. The membrane of claim 1 wherein:
    the electrolyte is metal oxide doped ceria or metal doped ceria.

17. A fuel cell comprising:
    an anode layer;
    a cathode layer; and
    the membrane of claim 1 between the anode layer and the cathode layer.

18. A fuel cell comprising:
    an anode layer;
    a cathode layer; and
    the membrane of claim 6 between the anode layer and the cathode layer,
    wherein current flow is in a direction of the grain-wall interface.

19. A gas sensor comprising:
    the membrane of claim 1.

20. An electrocatalytic apparatus comprising:
    the membrane of claim 1.

21. The membrane of claim 1 wherein:
    the matrix is prepared using engineered molecular assembly templated synthesis.

* * * * *

UNITED STATES PATENT AND TRADEMARK OFFICE
CERTIFICATE OF CORRECTION

PATENT NO. : 7,641,997 B2 Page 1 of 1
APPLICATION NO. : 10/947836
DATED : January 5, 2010
INVENTOR(S) : Hu et al.

It is certified that error appears in the above-identified patent and that said Letters Patent is hereby corrected as shown below:

Column 7, line 27 "ZrNY" should be -- Zr/Y --

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,641,997 B2  Page 1 of 1
APPLICATION NO. : 10/947836
DATED : January 5, 2010
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1151 days.

Signed and Sealed this

Twenty-first Day of December, 2010

David J. Kappos
*Director of the United States Patent and Trademark Office*